Patented Apr. 27, 1954

2,677,005

UNITED STATES PATENT OFFICE 2,677,005

THERMOCOUPLE

Thomas Land and Ronald Colgan Jewell, Sheffield, England, assignors to The Sheffield Smelting Company Limited, Sheffield, England, a British company No Drawing. Application March 31, 1952,
Serial No. 279,692

7 Claims. (Cl. 136—5)

The use of precious metal thermocouples for the measurement of high temperatures is well established in science and industry. In particular pure platinum and an alloy of platinum incorporating either 10% or 13% rhodium have been used in combination as a thermocouple for many years. The normal temperature range to be measured in industry or scientific use is 0° C. to 1400° C. In 1934 or thereabouts the use of this thermocouple combination was extended to measure temperatures up to 1700° C. for molten steel. The maximum possible temperature measurable with this combination is 1769 C.: beyond that temperature the pure platinum melts and the thermocouple is destroyed.

The use of oxygen gas in refining molten steel has recently been found to have certain advantages, but it may raise the temperature of the molten steel beyond the melting point of platinum. It is desirable to measure these temperatures, which may be as high as 1950° C., i. e. 180° C. approximately higher than the maximum measurable with the platinum: 10 or 13% rhodium-platinum thermocouple. Optical and radiation pyrometers have been used to a certain extent for measuring these higher temperatures, but they are not as satisfactory or convenient to use as thermocouples. No completely satisfactory materials have been available for thermocouples for continuous industrial use at temperatures above 1769° C. to give the same accuracy and reliability as the existing platinum: 10 or 13% rhodium-platinum thermocouples.

It is desirable that materials to be used as thermocouples should be ductile so as to be capable of being drawn to thin wire and thereby keep down the cost of the thermocouple; they should exihibit no appreciable oxidation and have a slow rate of volatilisation; and they should have these desired properties without requiring any special protective atmosphere. In particular, the most important requirement is that they should have a reproduceable and constant electromotive force characteristic which should not alter rapidly with continuous use at high temperatures.

We have found that a thermocouple combination of two elements made of different alloys of platinum and rhodium, each incorporating 20% by weight at least of rhodium, up to and including pure rhodium for one element, are very suitable for the measurement of high temperatures in the range of 1900° to 1950° C.

One example of such a combination, suitable for measurement of temperatures up to 1950° C., comprises one element made of rhodium and the other element made of a rhodium platinum alloy incorporating 40% by weight of rhodium with the balance of platinum.

In particular, a thermocouple combination having one element made of an alloy of approximately 20% by weight rhodium, 80% by weight platinum, with the other element made of an alloy of approximately 40% by weight rhodium, 60% by weight platinum is eminently satisfactory and capable of measuring temperatures up to 1900° C. or thereabouts. Both these alloys are ductile, can be drawn to wire satisfactorily, and are not brittle to handle or use. They do not oxidise nor volatilise rapidly at high temperatures, and give reproduceable electro-motive force characteristics corresponding to different temperatures.

The combination according to the invention enables high temperatures to be measured in various industrial processes, such as steel melting, glass melting, and special alloy melting; and the combination also furthers the study of research by enabling high temperatures to be measured accurately and easily.

We claim:

1. A thermocouple combination having its two elements each made of a rhodium-platinum alloy, the alloy of one element incorporating by weight 20% of rhodium and 80% of platinum, and the other alloy of the other element incorporating by weight 40% of rhodium and 60% of platinum.

2. A thermocouple combination having one element made of rhodium and the other element made of rhodium platinum alloy incorporating 20% by weight of rhodium with the balance of platinum.

3. A thermocouple combination having one element made of rhodium and the other element made of a rhodium platinum alloy incorporating 40% by weight of rhodium with the balance of platinum.

4. A thermocouple combination comprising two rhodium-platinum alloy elements, each of said elements having at least 20 per cent by weight of rhodium and the balance of platinum.

5. A thermocouple combination comprising one element made of a rhodium-platinum alloy incorporating at least twenty per cent by weight of rhodium with the balance of platinum and a second element made of rhodium.

6. A thermocouple combination comprising one element made of a rhodium-platinum alloy incorporating at least twenty per cent by weight of rhodium with the balance of platinum and a second element of a different rhodium-platinum alloy incorporating more than twenty per cent by weight of rhodium with the balance of platinum.

7. A thermocouple combination comprising two elements of rhodium-platinum alloy, said elements having different amounts of the order of twenty per cent by weight of rhodium therein.

References Cited in the file of this patent

UNITED STATES PATENTS

| Number | Name | Date |
|---|---|---|
| 1,789,733 | Feuszner | Jan. 20, 1931 |
| 2,012,465 | Dodecke | Aug. 27, 1935 |

OTHER REFERENCES

International Critical Tables of Numerical Data, Physics, Chemistry, and Technology, vol. 6, 1929, pp. 213–221.

Carnegie Institute Publications #157, Day et al., 1911, pages 120–123.

The Condensed Chemical Dictionary, fourth edition, by Reinhold, 1950. Page 529.